(12) United States Patent
Fujita

(10) Patent No.: US 10,632,849 B2
(45) Date of Patent: Apr. 28, 2020

(54) DISPLAY DEVICE

(71) Applicant: MITSUBISHI JIDOSHA KOGYO KABUSHIKI KAISHA, Tokyo (JP)

(72) Inventor: Hidemasa Fujita, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 75 days.

(21) Appl. No.: 16/157,619

(22) Filed: Oct. 11, 2018

(65) Prior Publication Data

US 2019/0111788 A1   Apr. 18, 2019

(30) Foreign Application Priority Data

Oct. 13, 2017  (JP) ................. 2017-199506
Aug. 29, 2018  (JP) ................. 2018-160223

(51) Int. Cl.
| | |
|---|---|
| *B60L 3/12* | (2006.01) |
| *G07C 5/06* | (2006.01) |
| *B60K 35/00* | (2006.01) |
| *B60K 37/02* | (2006.01) |
| *G06T 11/60* | (2006.01) |
| *B60W 50/14* | (2020.01) |

(52) U.S. Cl.
CPC ............. *B60L 3/12* (2013.01); *B60K 35/00* (2013.01); *B60K 37/02* (2013.01); *G07C 5/06* (2013.01); *B60K 2370/16* (2019.05); *B60K 2370/168* (2019.05); *B60K 2370/172* (2019.05); *B60K 2370/174* (2019.05); *B60K 2370/52* (2019.05); *B60L 2250/16* (2013.01); *B60L 2260/20* (2013.01); *B60W 2050/146* (2013.01); *G06T 11/60* (2013.01)

(58) Field of Classification Search
CPC .... B60L 3/12; B60L 2260/20; B60L 2250/16; B60L 15/20; B60K 37/02; B60K 35/00; B60K 2370/172; B60K 2370/168; B60K 2370/174; B60K 2370/52; B60K 2370/16; G07C 5/06; B60W 2050/146; G06T 11/60
See application file for complete search history.

(56) References Cited

U.S. PATENT DOCUMENTS

| | | | |
|---|---|---|---|
| 5,194,851 A * | 3/1993 | Kraning ............... | B62D 7/1509 180/415 |
| 5,309,139 A * | 5/1994 | Austin ................. | G07C 5/004 340/438 |
| 2004/0172954 A1* | 9/2004 | Hanson ............... | F25D 29/003 62/125 |
| 2013/0120126 A1* | 5/2013 | Fuke ................... | B60K 35/00 340/439 |
| 2014/0354610 A1* | 12/2014 | Hosoda ............... | A61B 5/18 345/204 |
| 2018/0109222 A1* | 4/2018 | Suzuki ................ | H02P 29/60 |
| 2019/0214931 A1* | 7/2019 | Minegishi ........... | B60L 3/003 |

FOREIGN PATENT DOCUMENTS

JP     2008-245412 A     10/2008

* cited by examiner

*Primary Examiner* — Darlene P Condra
(74) *Attorney, Agent, or Firm* — Birch, Stewart, Kolasch & Birch, LLP

(57) ABSTRACT

A display device used for an electric vehicle including a motor, includes a first area indicating torque of the motor and a second area indicating a coil temperature of a coil included in the electric motor.

5 Claims, 9 Drawing Sheets

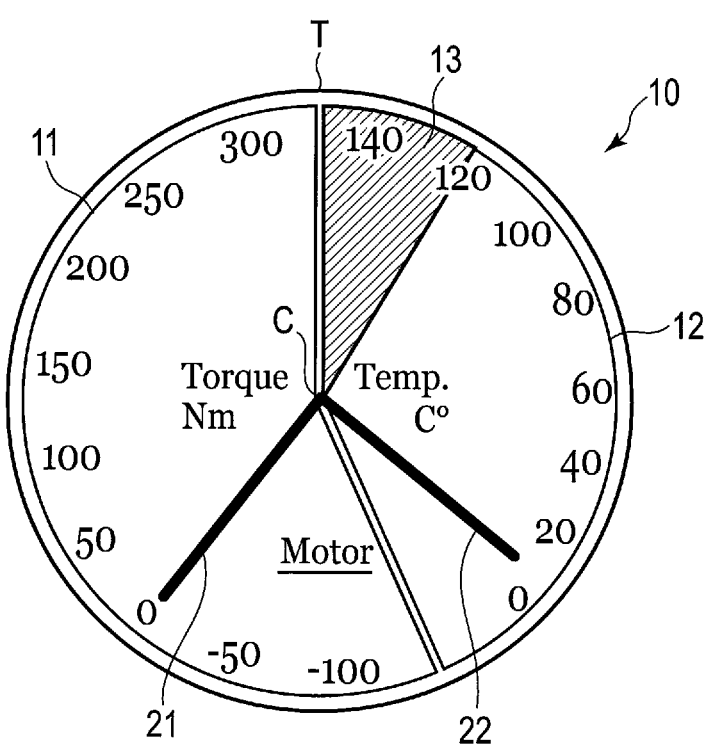
F I G. 1

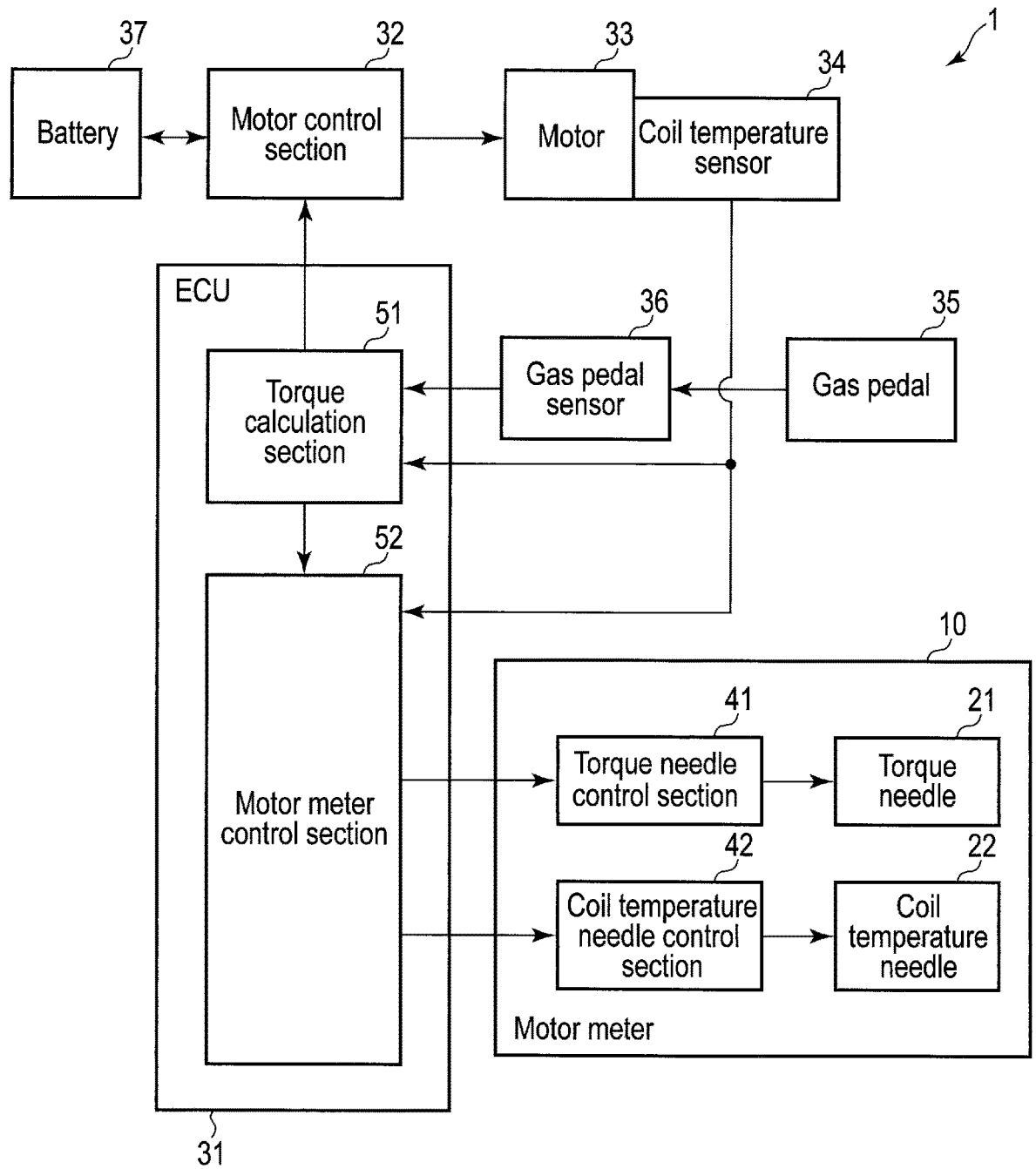
F I G. 2

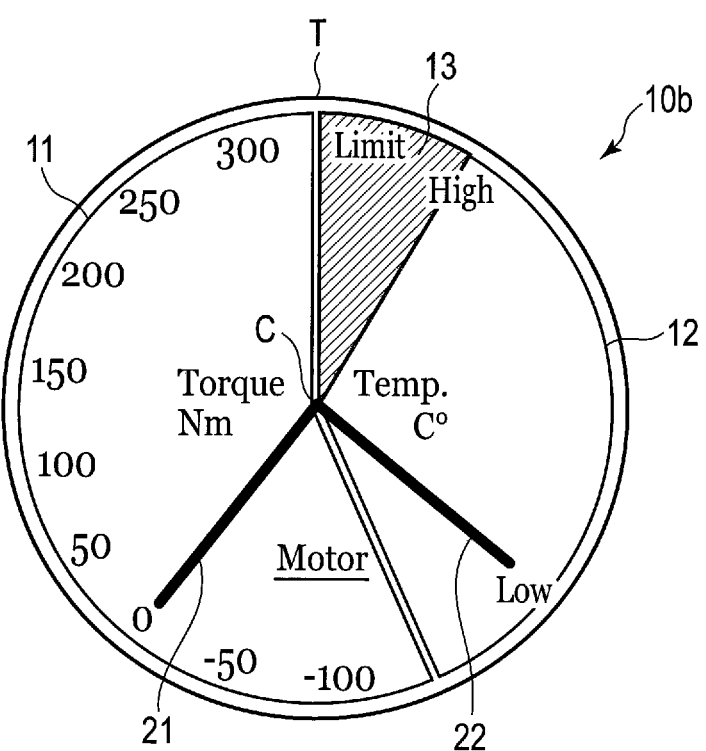
F I G. 11

DISPLAY DEVICE

CROSS-REFERENCE TO RELATED APPLICATION

This application is based upon and claims the benefit of priority from prior Japanese Patent Applications No. 2017-199506, filed Oct. 13, 2017; and No. 2018-160223, filed Aug. 29, 2018, the entire contents of all of which are incorporated herein by reference.

BACKGROUND

1. Field of the Invention

The present invention relates to a display device configured to display a state of an electric vehicle.

2. Description of the Related Art

In the field of rotating electrical machines, a technique for storing information about the saturation temperature of a stator, i.e., information in which at least a rotational speed and torque of a rotating electrical machine are used as parameters, and estimating the stator temperature on the basis the detected rotational speed and torque and stored information about the saturation temperature is known.

In general, in a vehicle incorporating therein an engine, a display device configured to display the state of the vehicle is provided. For example, a display device configured to display the temperature of cooling water of the engine to be detected by means of a water temperature gage is provided therein. By virtue of the temperature of the water temperature gage displayed on the display device, it is possible for the driver to visually confirm the heated state of the engine, and it becomes possible for the driver to grasp the state of the vehicle.

Incidentally, one of the features of the electric vehicle employing an electric motor as the driving source consists in being capable of starting with the maximum torque. However, in a conventional electric vehicle, a display device configured to display the state of torque has not been provided, and the driver has not been able to visually confirm the state of the electric vehicle. In these circumstances, for example, at the time of starting of an electric vehicle, even though an acceleration feeling that can never be obtained by a vehicle incorporating therein an engine can be obtained, the driver has not been able to visually confirm the state as a numeric character. Furthermore, in some electric vehicles, torque suppression processing of suppressing a rise in torque is executed when the coil temperature rises in order to prevent a short circuit of a coil inside the motor or magnetic force deterioration of the magnet from occurring. In the electric vehicle of this kind, the driver does not know not only the state of the torque but also the temperature of the coil, and hence when the torque is suppressed, even if the driver presses down on the gas pedal, the acceleration feeling of the electric vehicle becomes worse, and an uncomfortable feeling is given to the driver in some cases. Here, the conventional technique is a technique for estimating the stator temperature, and not a technique for displaying the stator temperature to the driver.

SUMMARY

A display device of the present invention is a display device used for an electric vehicle including an electric motor, and includes a first area indicating torque of the electric motor, and second area provided adjacent to the first area and indicating a coil temperature of a coil included in the electric motor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a view showing an example of a motor meter according to a first embodiment of the present invention.

FIG. 2 is a view showing an example of the configuration of an electric vehicle including the motor meter according to the embodiment.

FIG. 11 is a view showing an example of a motor meter according to a modified example of the embodiments.

DETAILED DESCRIPTION OF THE INVENTION

Figure 3:
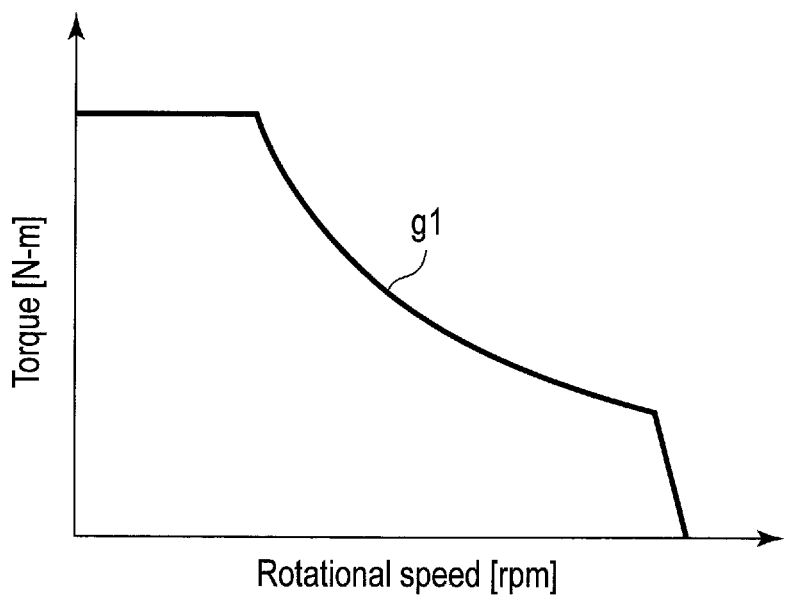
FIG. 3 is a view showing an example of a relationship between the torque and rotational speed of the motor according to the embodiment.

It should be noted that the aforementioned configuration "provided adjacent to the first area" is not limited to the case where the first area and second area are adjacent to each other without a gap between them, and includes the case where another display form intervenes between them. That is, in the present invention, it is sufficient if the user can recognize the first area and second area to be visually adjacent to each other.

Further, the display device may also include a third area indicating an area in which torque is suppressed. Thereby, it is possible to make the driver visually confirm in advance that torque suppression will be applied. Furthermore, the third area may also be configured to be included in the second area. Thereby, there is no need to separately provide a part to be visually confirmed by the driver, and the driver can grasp both the second area and third area at one time.

Furthermore, the display device may also include an area control section capable of changing the area of the third area according to a traveling mode. Thereby, it becomes possible to change the third area according to the traveling mode. For example, in the case where an electric vehicle has, as the traveling modes, a sport mode in which the degree of freedom of the driver performance is heightened, and eco-friendly mode in which the electric power consumption of the battery serving as the driving source of the electric vehicle is curbed, when the sport mode is set, the third area may be made narrower and, when the eco-friendly mode is set, the third area may be made wider. As described above, at the time of the sport mode, the third area is made narrower, whereby the area in which accelerator-fully-opened traveling is enabled is artificially made wider and, at the time of the eco-friendly mode, the third area is made wider, whereby it is possible to allow the area in which torque suppression is not applied a margin and prevent the driver from being given an uncomfortable feeling.

Further, the display device may also be configured in such a manner that the display surface thereof is formed into a circular shape, the device is arranged in the electric vehicle so that the display surface described above can be opposed to the driver, and the first area and second area are separated from each other by a straight line connecting the center of the circular shape and apex position to each other. Thereby, it becomes easy for the driver to visually confirm both the torque and coil temperature.

According to the present invention, it is possible to provide a display device capable of making the driver recognize the state of an electric vehicle.

Embodiments of the present invention will be described with reference to the accompanying drawings.

First Embodiment

FIG. 1 is a view showing an example of a motor meter (display device) 10. The motor meter 10 is configured in such a manner that a display surface thereof is formed into a circular shape, and the meter 10 is arranged in an electric vehicle so that the display surface can be opposed to the driver. Accordingly, the motor meter 10 is configured to enable the driver to visually confirm the motor meter 10 easily. It should be noted that although the electric vehicle will be described in this embodiment in connection with a case of an electric automobile, it is sufficient if the electric vehicle is a vehicle employing a motor (electric motor) as a driving source and, for example, a hybrid automobile is included in the electric vehicle.

As shown in FIG. 1, on the display surface of the motor meter 10, a torque area (first area) 11 indicating torque of the motor, and coil temperature area (second area) 12 indicating a coil temperature of the coil included in the motor are provided.

The torque area 11 and coil temperature area 12 are separated from each other by a straight line connecting the center C of the circular shape and apex position (twelve o'clock position) T to each other. In the torque area 11, scale numbering from −100 to 300 is displayed as the amount of torque, a range from 0 to 300 indicates the torque at the time of acceleration, and range from 0 to −100 indicates the torque at the time of regeneration. As the coil temperature, scale numbering from 0° C. to 140° C. is displayed in the coil temperature area 12.

In the coil temperature area 12, furthermore a torque suppression area (third area) 13 indicating an area in which the torque is suppressed is provided. The torque suppression area 13 ranges from about 120° C. to the maximum temperature, and is displayed in a color different from the coil temperature area 12. For example, when the torque suppression area 13 is colored red, the coil temperature area 12 other than the torque suppression area 13 is colored white. As described above, the color of the torque suppression area 13 is made different from the other coil temperature area 12, whereby it becomes possible to notify the driver that the coil temperature is a temperature in the torque suppression area. In an electric vehicle, when the coil temperature inside the motor becomes high, the covering material covering the coil is melted, and there is a possibility of a short circuit or ignition being caused. Further, heat generation of the coil causes the magnet temperature inside the stator to rise, and there is a possibility of demagnetization which is magnetic force deterioration being caused. Accordingly, when the temperature of the coil rises to a fixed temperature or higher, the need to curb an increase in torque to thereby prevent a further rise in coil temperature from occurring arises, and hence torque suppression processing is executed. This principle will be described later. It should be noted that in this embodiment, although descriptions will be given in connection with the case where the torque suppression area 13 is provided in the coil temperature area 12, the case is not limited to this, and the torque suppression area 13 may be provided outside the coil temperature area 12, for example, a lamp indicating that a torque suppressed state is kept may also be provided.

Further, a torque needle (first needle) 21 rotating in the torque area 11 around the center C of the circular shape, and coil temperature needle (second needle) 22 rotating in the coil temperature area 12 are provided. The torque is concretely notified to the driver by the position indicated by the torque needle 21, and coil temperature is concretely notified to the driver by the position indicated by the coil temperature needle 22.

FIG. 2 is a view showing an example of the configuration of an electric vehicle 1 including the motor meter 10.

As shown in FIG. 2, the electric vehicle 1 is provided with an Electronic Control Unit (ECU) 31, motor control section 32, motor 33, coil temperature sensor 34, gas pedal (accelerator pedal) 35, gas pedal (accelerator pedal) sensor 36, battery 37, and motor meter 10. It should be noted that although the electric vehicle 1 includes other configurations configured to realize functions of the electric vehicle, illustrations and descriptions associated with the configurations are omitted.

The ECU 31 is constituted of a microprocessor, peripheral circuits thereof, and memories such as a ROM, RAM, and the like, and executes a control program stored in the ROM (illustration omitted) or the like by using the RAM (illustration omitted) as a work area to thereby realize various functions of the electric vehicle 1.

The motor control section 32 actuates the motor 33 on the basis of an instruction from the ECU 31. By the actuation of the motor 33, the power thereof is transmitted to the wheels (illustration omitted), whereby the electric vehicle 1 is driven. The motor 33 has a configuration identical to the hitherto existing motors and is configured in such a manner as to include, for example, a stator, rotor, coils (copper wires), and the like. The coil temperature sensor 34 is a thermistor configured to sense a temperature (hereinafter referred to as a coil temperature) of a coil inside the motor 33. The coil temperature sensor 34 outputs the sensed coil temperature to the ECU 31.

The gas pedal 35 is a pedal to be depressed by the driver when the driver intends to accelerate the electric vehicle 1.

The gas pedal sensor 36 senses the amount of depression of the gas pedal 35 depressed by the driver, and transmits the sensed depression amount to the ECU 31.

The battery 37 is the driving source of the electric vehicle 1. The battery 37 is connected to the motor control section 32 through a PN line and, at the time of normal traveling, supplies electric power to the motor 33 through the motor control section 32. Further, at the time of regeneration, the battery 37 receives regenerative energy from the motor 33, and stores therein the received regenerative energy.

The motor meter 10 includes a torque needle control section 41, torque needle 21, coil temperature needle control section 42, and coil temperature needle 22. The torque needle control section 41 actuates the torque needle 21 within the torque area 11 on the basis of an instruction from the ECU 31, and notifies the driver of the state of the torque of the motor 33 by the position of the torque needle 21. Further, the coil temperature needle control section 42 actuates the coil temperature needle 22 within the coil temperature area 12 on the basis of an instruction from the ECU 31, and notifies the driver of the state of the coil temperature by the position of the coil temperature needle 22.

Further, the ECU 31 includes a torque calculation section 51 and motor meter control section 52.

The torque calculation section 51 calculates the torque to be produced by the motor 33 according to a depressed amount of the gas pedal 35 input thereto from the gas pedal sensor 36. In this embodiment, the torque calculation section 51 suppresses the torque to be calculated according to the coil temperature received from the coil temperature sensor 34. Torque suppression will be described later with reference to FIG. 4 and FIG. 5.

The motor meter control section 52 transmits an instruction to actuate the torque needle 21 to the torque needle control section 41 on the basis of the torque calculated by the torque calculation section 51, and transmits an instruction to actuate the coil temperature needle 22 to the coil temperature needle control section 42 on the basis of the coil temperature received from the coil temperature sensor 34.

FIG. 3 is a view showing an example of a relationship between the torque and rotational speed of the motor. The axis of ordinate indicates the torque (N-m), and the axis of abscissa indicates the rotational speed (rpm). As shown by graph g1, when the torque is high, the rotational speed is low and, the lower the torque, the higher the rotational speed is. The torque and current value are proportional to each other, and the heating value (amount of heat generation) is proportional to the square of the current value, and hence when the operation is carried out at higher torque, the amount of heat generated from the coil inside the motor 33 becomes greater, whereby the coil temperature is raised higher. Accordingly, when the operation is continued at the high torque, the covering material or the like of the coil is melted, and there is a possibility of a short circuit, ignition or the like being caused as described previously, and hence when the coil temperature is high, the need to suppress the torque arises. Accordingly, the electric vehicle 1 is configured in such a manner as to carry out processing of suppressing the torque when the coil temperature is high.

Figure 4:
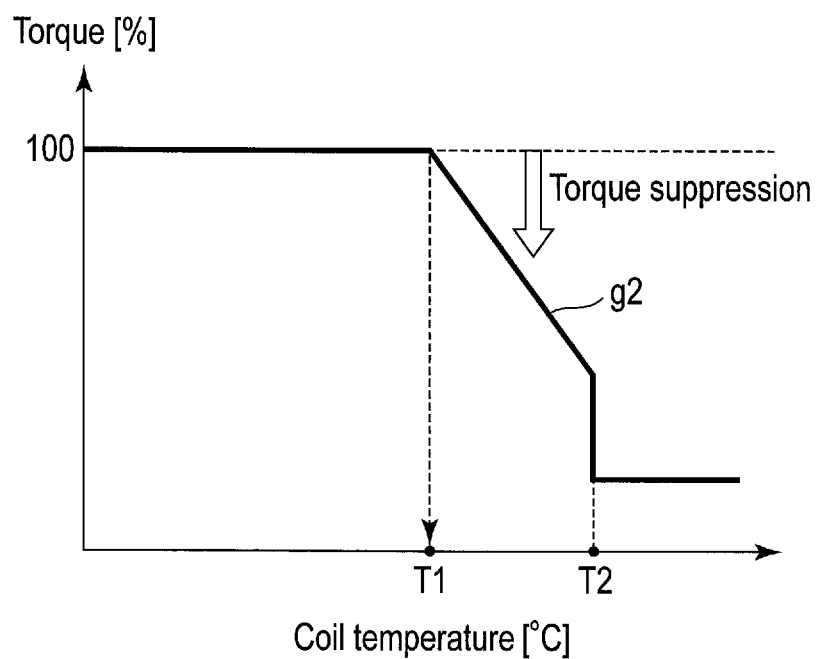
FIG. 4 is a view showing an example of a relationship between the coil temperature and calculated torque according to the embodiment.

FIG. 4 is a view showing an example of a relationship between the coil temperature and calculated torque. The axis of ordinate indicates the torque, and the axis of abscissa indicates the coil temperature. As shown by graph g2, although up to the coil temperature T1, the torque has a value of 100% (i.e., unsuppressed value), when the coil temperature exceeds the coil temperature T1, torque suppression is started, and the suppression factor becomes constant at temperatures higher than or equal to the coil temperature T2. The torque is suppressed in this manner, and hence even when the same amount of depression of the gas pedal 35 is obtained, acceleration of the electric vehicle 1 becomes worse at the time of torque suppression.

Figure 5:
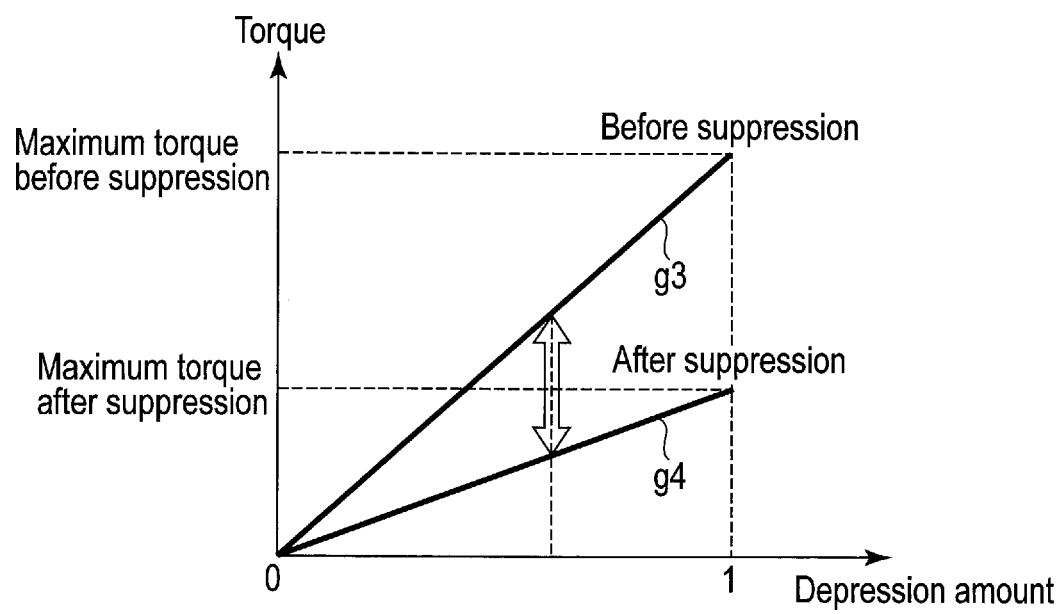
FIG. 5 is a view showing an example of torque suppression processing according to the embodiment.

FIG. 5 is a view showing an example of torque suppression processing. The axis of ordinate indicates the maximum torque, and the axis of abscissa indicates the amount of depression of the gas pedal 35. As shown by graph g3 and graph g4, the suppression is carried out in such a manner that the maximum torque (g4) after the suppression becomes lower than the maximum torque (g3) before the suppression. It should be noted that the torque suppression processing is not limited to this.

Figure 6:
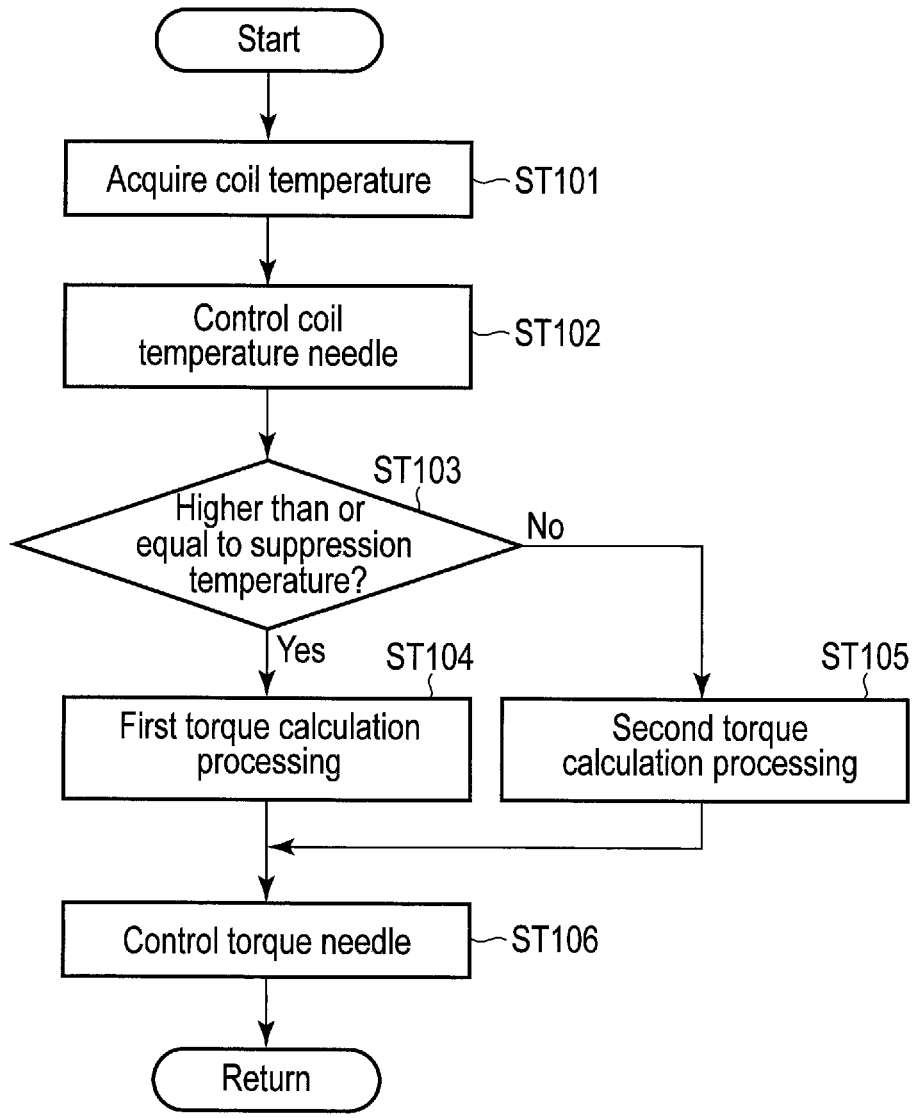
FIG. 6 is a flowchart showing an example of actuation processing of the motor meter according to the embodiment.

Next, control of the motor meter 10 will be described below. FIG. 6 is a flowchart showing an example of control of the motor meter 10 to be executed by the torque calculation section 51 and motor meter control section 52. This processing is executed at all times while the electric vehicle 1 is traveling.

As shown in FIG. 6, the motor meter control section 52 acquires the coil temperature (ST101). That is, the motor meter control section 52 acquires the coil temperature of the coil inside the motor 33 from the coil temperature sensor 34. Next, the motor meter control section 52 controls the coil temperature needle 22 on the basis of the acquired coil temperature (ST102). More specifically, the motor meter control section 52 transmits an instruction to make the coil temperature needle 22 indicate the acquired temperature to the coil temperature needle control section 42. Thereby, when the coil temperature rises, the coil temperature needle 22 is moved to the apex position T (temperature is higher) side and, when the coil temperature lowers, the coil temperature needle 22 is moved from the apex position T side to the opposite (temperature is lower) side. Accordingly, the driver can always grasp the coil temperature at the time of traveling of the electric vehicle 1 by the position of the coil temperature needle 22 within the coil temperature area 12.

Next, the torque calculation section 51 determines whether or not the acquired coil temperature is higher than or equal to the suppression temperature (ST103). Here, the suppression temperature is a temperature at which the covering material covering the coil inside the motor 33 is melted, and there is a possibility of a short circuit of the coil or ignition thereof being caused or a magnet temperature at which the magnetic force deterioration occurs. For example, in the case of aforementioned FIG. 1, the suppression temperature is about 120° C., and in the case of aforementioned FIG. 4, the suppression temperature is the coil temperature T1. The suppression temperature can arbitrarily be set according to the covering material covering the coil, material of the magnet or the like.

Next, upon determination that the acquired coil temperature is higher than or equal to the suppression temperature (ST103: YES), the torque calculation section 51 executes first torque calculation processing (ST104). The first torque calculation processing is the aforementioned torque suppression processing, and is the processing of calculating the maximum torque according to the amount of depression of the gas pedal 35 and, thereafter, when a gain corresponding to the coil temperature is applied, suppressing the maximum torque (reference: FIG. 4, FIG. 5). Further, upon determination that the acquired coil temperature is not higher than or equal to the suppression temperature (ST103: NO), the torque calculation section 51 executes second torque calculation processing (ST105). The second torque calculation processing is the processing of calculating the torque according to the depression amount.

When the first torque calculation processing (ST104) or second torque calculation processing (ST105) is completed, the motor meter control section 52 controls the torque needle 21 on the basis of the torque calculated by the torque calculation section 51 (ST106). More specifically, the motor meter control section 52 transmits an instruction to make the torque needle 21 indicate the calculated torque to the torque needle control section 41. Thereby, when the torque increases, the torque needle 21 is moved to the apex position T (torque is higher) side and, when the torque lowers, the torque needle 21 is moved from the apex position T side to the opposite (torque is lower) side. Accordingly, the driver can always grasp the torque at the time of traveling of the electric vehicle 1 by the position of the torque needle 21 within the torque area 11. Then, the processing is shifted to "return" of the flow.

According to the motor meter 10 configured in the manner described above, the driver can visually confirm both the torque and coil temperature of the electric vehicle 1 at one time, and hence the driver can predict occurrence of torque suppression in advance while recognizing the coil temperature and, even if torque suppression is suddenly applied to the electric vehicle 1 and the acceleration feeling becomes worse, the driver can escape suffering an uncomfortable feeling.

Further, the motor meter 10 includes the torque suppression area 13 indicating an area in which the torque is suppressed, and hence it is possible to make the driver visually confirm in advance that torque suppression will be applied. Furthermore, the torque suppression area 13 is included in the coil temperature area 12, and hence there is no need to separately provide a part to be visually confirmed by the driver, and the driver can grasp both the coil temperature area 12 and torque suppression area 13 at one time.

Further, the motor meter 10 is configured in such a manner that the display surface thereof is formed into a circular shape, the motor meter 10 is arranged in the electric vehicle 1 so that the display surface can be opposed to the driver, and the torque area 11 and coil temperature area 12 are separated from each other by a straight line connecting the center of the circular-shape and apex position to each other, whereby it becomes easy for the driver to visually confirm both the torque and coil temperature.

Second Embodiment

A second embodiment differs from the first embodiment in that the second embodiment is configured in such a manner that the display area of the torque suppression area 13 changes according to the traveling mode of the electric vehicle, and hence hereinafter this point will be described in detail. It should be noted that configurations identical to the first embodiment are denoted by reference symbols identical to the first embodiment and detailed description are omitted with respect to these configurations.

Figure 7:
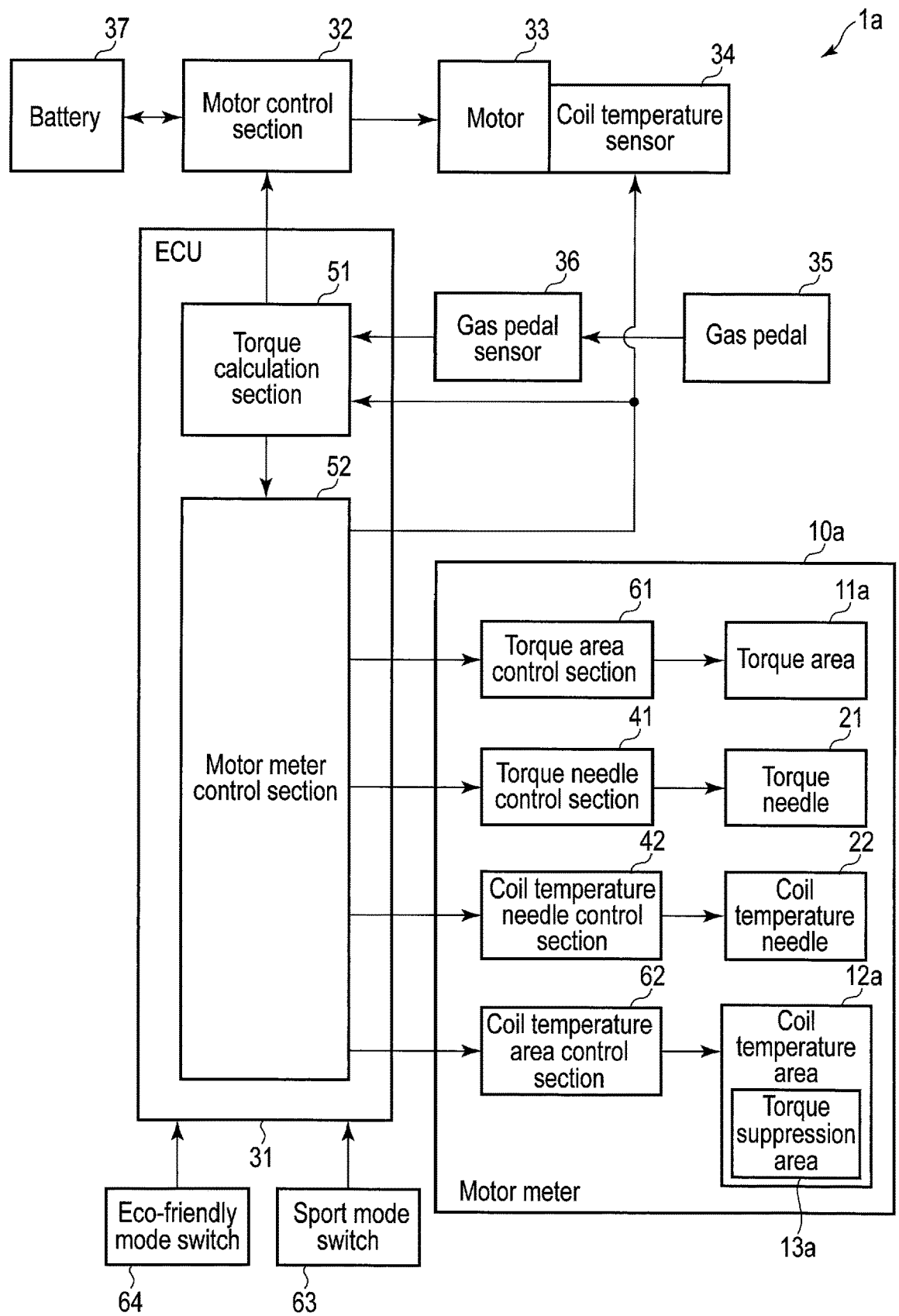
FIG. 7 is a view showing an example of an electric vehicle including a motor meter according to a second embodiment of the present invention.

FIG. 7 is a view showing an example of the configuration of an electric vehicle 1 including a motor meter 10a. In addition to the configuration described with reference to FIG. 2, a torque area control section 61, torque area 11a, coil temperature area control section 62, and coil temperature area 12a are provided. Further, in the coil temperature area 12a, a torque suppression area 13a is provided. It should be noted that in this embodiment, although descriptions will be given in connection with the case where the torque suppression area 13a is provided in the coil temperature area 12a, the torque suppression area 13a may also be provided separately from the coil temperature area 12a, this being identical to the first embodiment.

The torque area 11a, coil temperature area 12a, and torque suppression area 13a are constituted of, for example, a liquid crystal display, and are configured in such a manner that their display colors can be changed on the basis of an instruction of the motor meter control section 52. The torque area 11a is an area configured to indicate the torque, coil temperature area 12a is an area configured to indicate the coil temperature, and torque suppression area 13a is an area configured to indicate the torque suppression area, this being identical to the first embodiment. It should be noted that the torque area 11a, coil temperature area 12a, and torque suppression area 13a may not only be constituted of a liquid crystal display, but may also be constituted of other displays, for example, an organic EL display.

The torque area control section 61 controls display of the torque area 11a. Further, the coil temperature area control section 62 controls display of the coil temperature area 12a and torque suppression area 13a. The coil temperature area control section 62 is furthermore configured in such a manner as to be able to change (wider or narrower) the torque suppression area 13a in the coil temperature area 12a on the basis of an instruction of the motor meter control section 52.

The traveling mode is configured to be set by the driver by means of a mode switch and, in this second embodiment, a sport mode switch 63 and eco-friendly mode switch 64 are provided. The sport mode switch 63 is a switch configured to make the electric vehicle 1 travel in the sport mode. The sport mode is a mode in which set values use of which is normally restricted are relaxed in order to increase the degree of freedom of the driver performance, and enable the electric vehicle 1 to be maneuvered like a sports car. Further, the eco-friendly mode switch 64 is a switch configured to curb the power consumption of the battery 37 at the time of traveling of the electric vehicle 1. It should be noted that traveling mode setting switches other than the sport mode switch 63 and eco-friendly mode switch 64 may also be provided.

Figure 8:
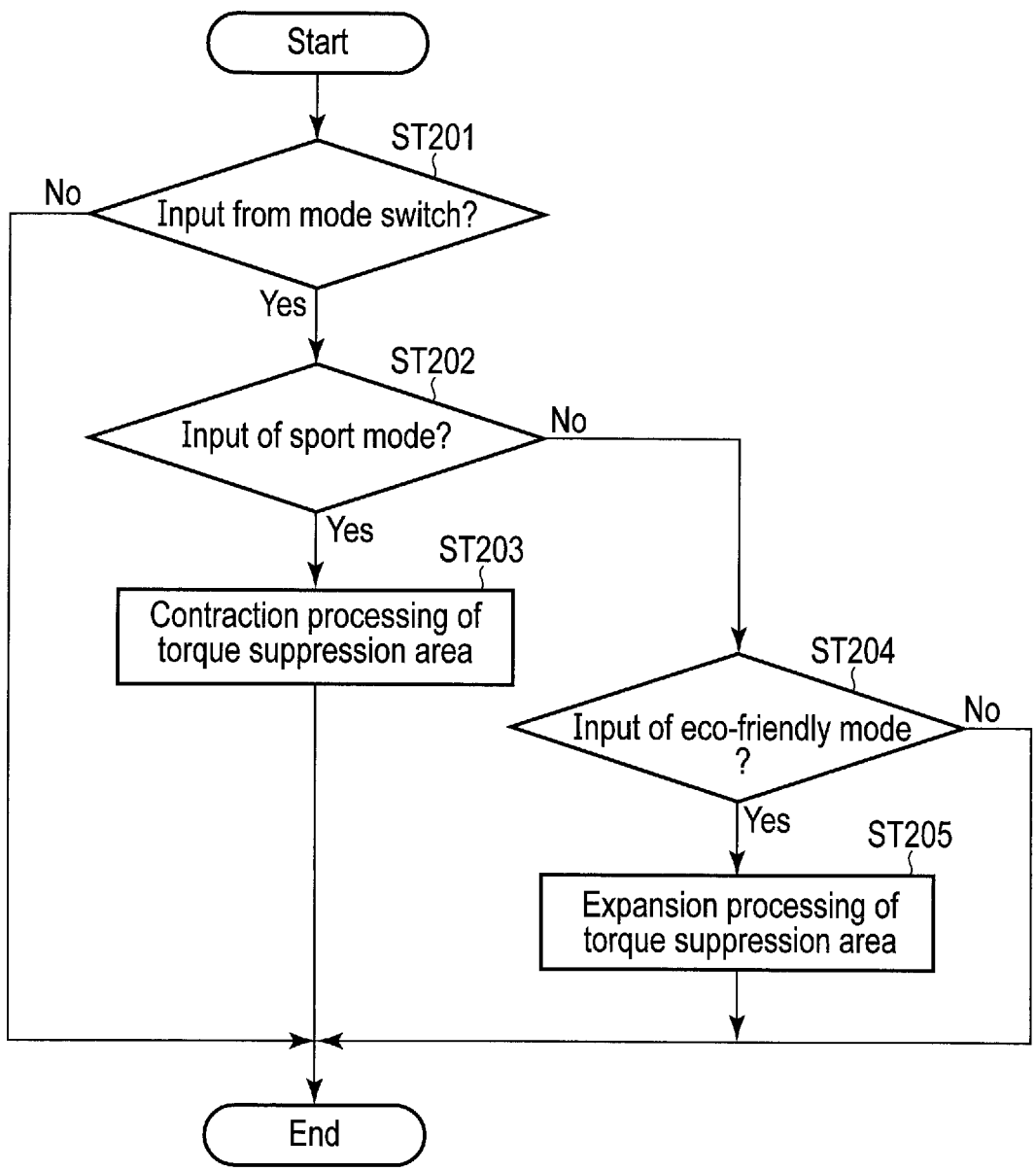
FIG. 8 is a flowchart showing an example of third area change processing according to the embodiment.

Next, processing of changing the torque suppression area 13a will be described below. FIG. 8 is a flowchart showing an example of torque suppression area change processing to be executed by the motor meter control section 52.

The motor meter control section 52 determines whether or not there is an input from the mode switch (ST201). Upon determination that there is an input from the mode switch (ST201: YES), the motor meter control section 52 determines whether or not the input from the mode switch is an input of the sport mode, i.e., whether or not the input is an input from the sport mode switch 63 (ST202). Upon determination that the input is an input of the sport mode (ST202: YES), the motor meter control section 52 executes contraction processing of the torque suppression area 13a (ST203). The contraction processing of the torque suppression area 13a is processing to be carried out in such a manner that the motor meter control section 52 transmits an instruction to contract the display area of the torque suppression area 13a to the apex position T side to the coil temperature area control section 62. For example, as shown in the motor meter 10a of FIG. 9, the torque suppression area 131 is displayed in such a manner as to be narrowed toward the apex position T side as compared with the case where the traveling mode is not set. That is, the torque suppression area 131 becomes narrower than the torque suppression area 13a, and the torque suppression area 131 ranges from a temperature higher than that before the sport mode has been set to the maximum temperature. Then, the processing is terminated.

Further, upon determination that the input is not an input of the sport mode (ST202: NO), the motor meter control section 52 determines whether or not the input from the mode switch is an input of the eco-friendly mode, i.e., whether or not the input is an input from the eco-friendly mode switch 64 (ST204). Upon determination that the input is an input of the eco-friendly mode (ST204: YES), the motor meter control section 52 executes expansion processing of the torque suppression area 13a (ST205). The expansion processing of the torque suppression area 13a is processing to be carried out in such a manner that the motor meter control section 52 transmits an instruction to expand the display area of the torque suppression area 13a to the opposite side of the apex position T to the coil temperature area control section 62. As shown in, for example, the motor meter 10a of FIG. 10, the torque suppression area 132 is displayed in such a manner as to be widened toward the opposite side of the apex position T as compared with the case where the traveling mode is not set. That is, the torque suppression area 132 becomes wider than the torque suppression area 13a, and the torque suppression area 132 ranges from a temperature lower than that before the eco-friendly mode has been set to the maximum temperature. Then, the processing is terminated.

On the other hand, when it is determined in step ST201 that there is no input from the mode switch (ST201: NO) or when it is determined in step ST204 that the input is not an input of the eco-friendly mode (ST204: NO), the processing is terminated.

According to the motor meter 10a configured in the manner described above, the coil temperature area control section 62 is provided therein, and hence it becomes possible to change the torque suppression area 13a according to the traveling mode to be set by the driver.

Figure 9:
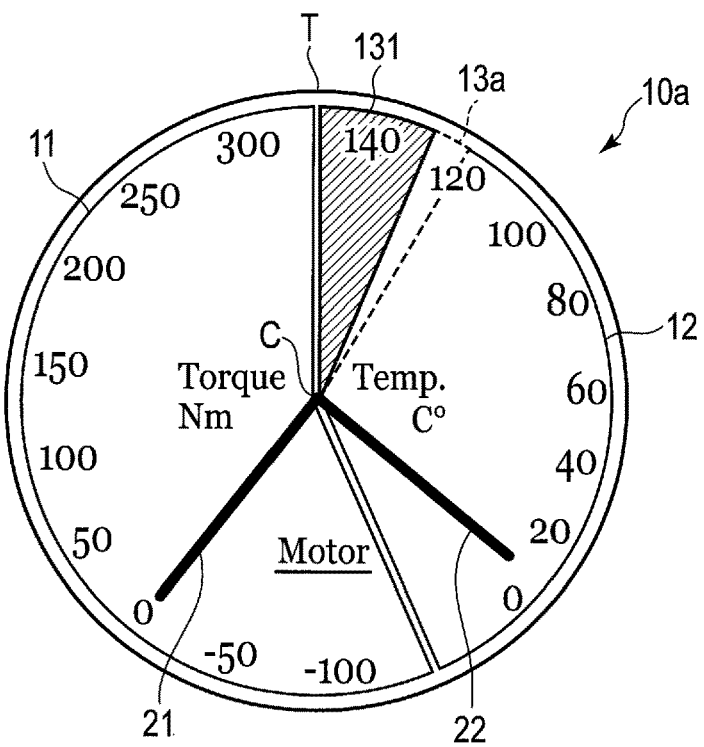
FIG. 9 is a view showing an example of the motor meter according to the embodiment.
Figure 10:
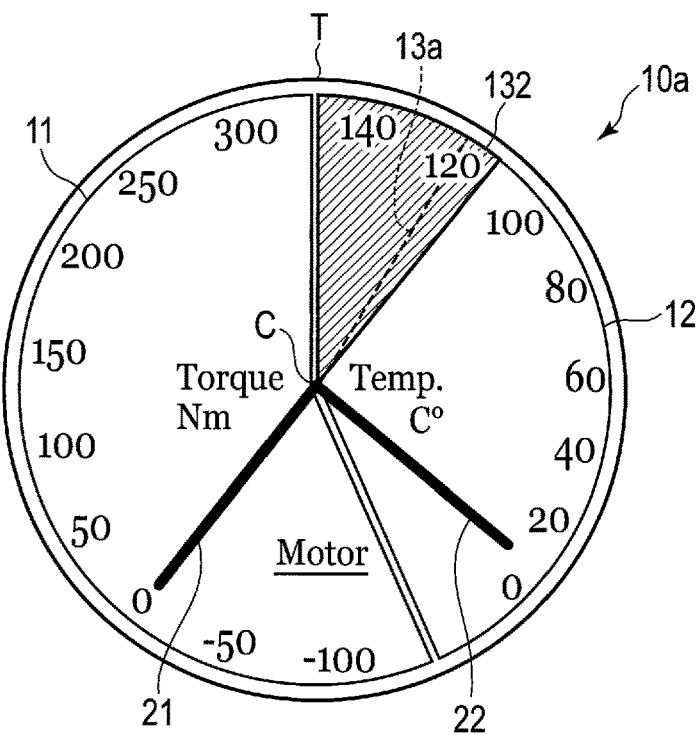
FIG. 10 is a view showing an example of the motor meter of the embodiment.

More specifically, when the sport mode is set, it is possible to set the torque suppression area 131 (reference: FIG. 9) formed by narrowing the torque suppression area 13a in the coil temperature area 12a toward the apex position T side and, when the eco-friendly mode is set, it is possible to set the torque suppression area 132 (reference: FIG. 10) formed by widening the torque suppression area 13a in the coil temperature area 12a toward the opposite side of the apex position T. As described above, at the time of the sport mode, the torque suppression area 13a is made narrower, whereby it is possible to artificially widen the area in which full-throttle traveling is enabled and, at the time of the eco-friendly mode, the torque suppression area 13a is made wider, whereby it is possible to allow the area in which torque suppression is not applied a margin and prevent the driver from being given an uncomfortable feeling.

It should be noted that in the embodiments described above, although the descriptions have been given in connection with the case where the torque needle control section 41 actuates the torque needle 21 according to the calculated torque, and the coil temperature needle control section 42 actuates the coil temperature needle 22 according to the acquired coil temperature, whereby the driver is notified of the torque and coil temperature, the configuration for notification of the torque and coil temperature is not limited to this. For example, the configuration may be contrived in such a manner that a plurality of display sections such as gages are provided in each of the torque area 11 and coil temperature area 12, and each of the plurality of display sections is subjected to turning-on/off control according to the torque and coil temperature, whereby the driver is notified of the torque and coil temperature.

Further, in the embodiments described above, although the descriptions have been given in connection with the case where in the motor meters 10 and 10a, each of the torque area 11 and coil temperature area 12 indicates a concrete numeral, the case is not limited to this. For example, as shown in the motor meter 10b of FIG. 11, numerals may be used only in the torque area 11 and, in the coil temperature area 12, degrees such as Limit, High, and Low may be displayed.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

What is claimed is:

1. A display device used for an electric vehicle including an electric motor comprising:
   a first area indicating torque of the electric motor; and
   a second area provided adjacent to the first area and indicating a coil temperature of a coil included in the electric motor.

2. The display device of claim 1, further comprising, within the second area, a third area indicating an area in which the torque is suppressed.

3. The display device of claim 2, further comprising an area control section capable of changing the area of the third area according to a traveling mode.

4. The display device of claim 3, wherein
   the electric vehicle possesses, as traveling modes, a sport mode in which a degree of freedom of a driver performance is increased, and an eco-friendly mode in which an electric power consumption of a battery serving as a driving source is curbed, and
   the area control section makes the third area narrower when the sport mode is set and makes the third area wider when the eco-friendly mode is set.

5. The display device of claim 1, wherein
   the display device is configured in such a manner that a display surface thereof is formed into a circular shape, and is arranged in the electric vehicle so that the display surface can be opposed to a driver, and
   the first area and the second area are separated from each other by a straight line connecting a center of the circular shape and an apex position to each other.

* * * * *